US012167189B2

(12) United States Patent
Bowman

(10) Patent No.: US 12,167,189 B2
(45) Date of Patent: Dec. 10, 2024

(54) SPEAKER HOUSING ASSEMBLY

(71) Applicant: Southeastern Underdeck Systems, LLC, Buford, GA (US)

(72) Inventor: Heath Harold Bowman, Buford, GA (US)

(*) Notice: Subject to any disclaimer, the term of this patent is extended or adjusted under 35 U.S.C. 154(b) by 0 days.

(21) Appl. No.: 18/459,985

(22) Filed: Sep. 1, 2023

(65) Prior Publication Data

US 2023/0412952 A1 Dec. 21, 2023

Related U.S. Application Data

(62) Division of application No. 17/308,965, filed on May 5, 2021, now Pat. No. 11,825,255.

(51) Int. Cl.

*H04R 1/02* (2006.01)
*E04B 1/00* (2006.01)

(52) U.S. Cl.

CPC ............. *H04R 1/026* (2013.01); *H04R 1/023* (2013.01); *H04R 1/025* (2013.01); *E04B 1/003* (2013.01)

(58) Field of Classification Search

CPC ........ H04R 1/026; H04R 1/023; H04R 1/025; E04B 1/003

USPC .......................................................... 381/391

See application file for complete search history.

(56) References Cited

U.S. PATENT DOCUMENTS

| | | | | |
|---|---|---|---|---|
| 5,206,464 A * | 4/1993 | Lamm | H04R 1/025 181/150 |
| 2004/0047487 A1* | 3/2004 | Popken | H04R 1/025 381/332 |
| 2004/0179710 A1* | 9/2004 | Farinelli, Jr. | H04R 1/025 181/150 |
| 2010/0040254 A1* | 2/2010 | Wright | H04R 1/02 381/395 |

* cited by examiner

*Primary Examiner* — Sean H Nguyen

(74) *Attorney, Agent, or Firm* — Perilla Knox & Hildebrandt LLP; Kenneth A. Knox

(57) ABSTRACT

Disclosed are various embodiments of a method of assembling a speaker housing assembly of a speaker for a deck structure. In one non-limiting example, the method can comprise providing a base enclosure of the speaker housing assembly, attaching a mounting bracket in an interior of the base enclosure, positioning a speaker within a speaker aperture of the mounting bracket, attaching, using a fastener, a perimeter of the speaker to the mounting bracket; and attaching a speaker cover to an end of the base enclosure.

20 Claims, 8 Drawing Sheets

SPEAKER HOUSING ASSEMBLY

CROSS REFERENCE TO RELATED PATENT APPLICATIONS

This application is a divisional application of, and claims priority to, co-pending U.S. Patent Application "A SPEAKER HOUSING ASSEMBLY," filed on May 5, 2021, which is incorporated by reference herein in its entirety.

BACKGROUND

An outdoor deck may comprise multiple floor members, such as wooden boards. The floor members may form a platform that is elevated above the ground. The deck may provide an outdoor space for entertaining guests or other purposes.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The platform of a deck may be formed of decking or multiple floor members, such as wooden boards, that are arranged in a substantially planar fashion. Spacings may exist between the floor members that form the platform. As such, if the deck is exposed to a liquid, such as but not limited to rain, a spilled drink, or water from a leaking hose, the liquid may pass through the deck via the spacings or other openings in the deck. The liquid may fall from the deck onto people or property that located beneath the deck. In some cases, a drainage system can be installed to drain away the liquid that falls from the deck. As a result, the drainage system can prevent liquids from falling onto people and property under the deck. However, the exposure to moisture in and around the drainage system can present a challenge for installing sensitive devices on or around a deck structure.

The present disclosure is directed to a speaker housing assembly that protects a speaker from moisture in an outdoor environment. The various embodiments of the speaker housing assembly in the present disclosure can be installed in various locations on a deck structure, a deck drainage system, an exterior of a house, and other suitable outdoor locations. As will be described in further detail below, the various embodiments of the present disclosure provide a seal that protects sensitive devices, such as audio electronics, from exposure to moisture. Furthermore, some embodiments employ mechanical components that can improve the audio quality from enclosed speakers.

Figure 1:
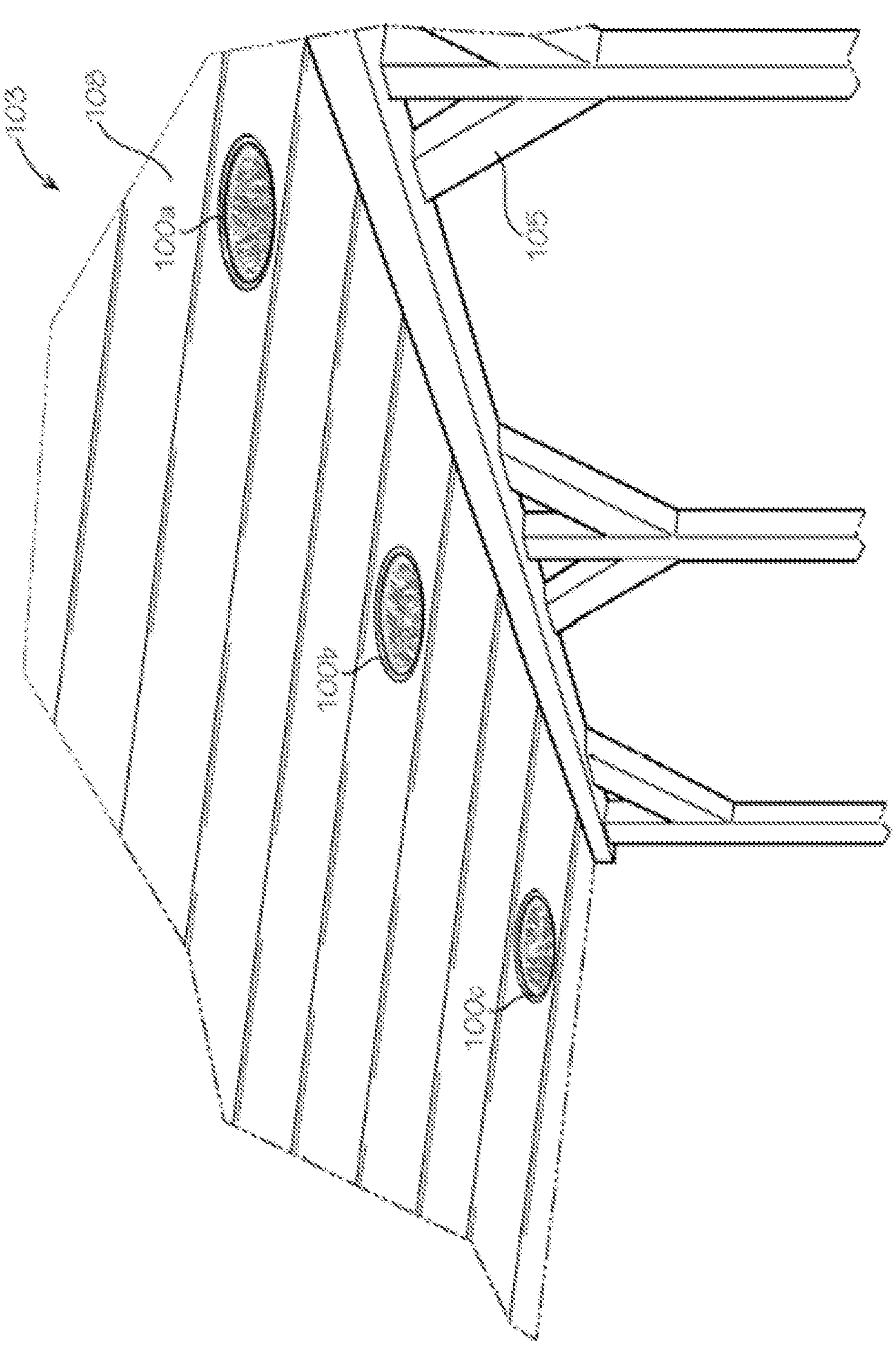
FIG. 1 is an illustration of a speaker housing assembly installed within a deck drainage system, according to one embodiment described herein.

With reference to FIG. 1, shown is an illustration of multiple speaker housing assemblies 100*a*, 100*b*, 100*c* (collectively "the speaker housing assemblies 100") installed within a deck drainage system 103. Shown on FIG. 1 in particular, the deck drainage system 103 is attached beneath a deck structure 105. In this illustrated example, multiple speaker housing assemblies 100 are installed within a portion of a floor panel 108 of the deck drainage system 103. Each speaker housing assembly 100 may contain a speaker that is connected to an entertainment system.

In some embodiments, the deck drainage system 103 may include one or more hangers, one or more floor panels 108, and/or other components. It is noted that only some of the hangers and floor panels 108 illustrated in FIG. 1 are labeled for purposes of clarity. The hangers may be suspended from the platform of the deck, and the floor panels 108 may be attached to the hangers and thus suspended below the deck platform.

When liquid falls through spacings or other openings of the deck platform, the liquid may fall onto the floor panels 108 instead of falling directly to the ground. Additionally, the floor panels 108 may be configured so that the liquid is channeled by the floor panels 108 in a particular direction. For example, the floor panels 108 may channel the liquid towards one or more gutters, downspouts or other suitable conduits for the liquid. In this arrangement, the speaker housing assemblies 100 can be inserted through the floor panels 108 of the deck drainage system 103. The exterior of the speaker housing assemblies 100 can protect the speaker and other audio components from the liquid passing through the deck drainage system 103. In other cases, the speaker housing assembly 100 can be attached directly to the deck structure, the exterior of a house, and other structures.

The speaker housing assemblies 100 can be installed or attached to various deck structures. As shown in FIG. 1, the speaker housing assemblies 100 can be installed into the deck drainage system 103. An installer can cut a hole in the floor panel 108 and configure a portion of the speaker housing assembly 100 to appear through the hole in the floor panel 108.

In some cases, the speaker housing assembly 100 may be attached to other deck structures, such as an overhead crossbeam, a deck post, and other suitable deck structures. In other examples, the speaker housing assembly 100 may be attached to an exterior of a residence or a commercial building.

Figure 2A:
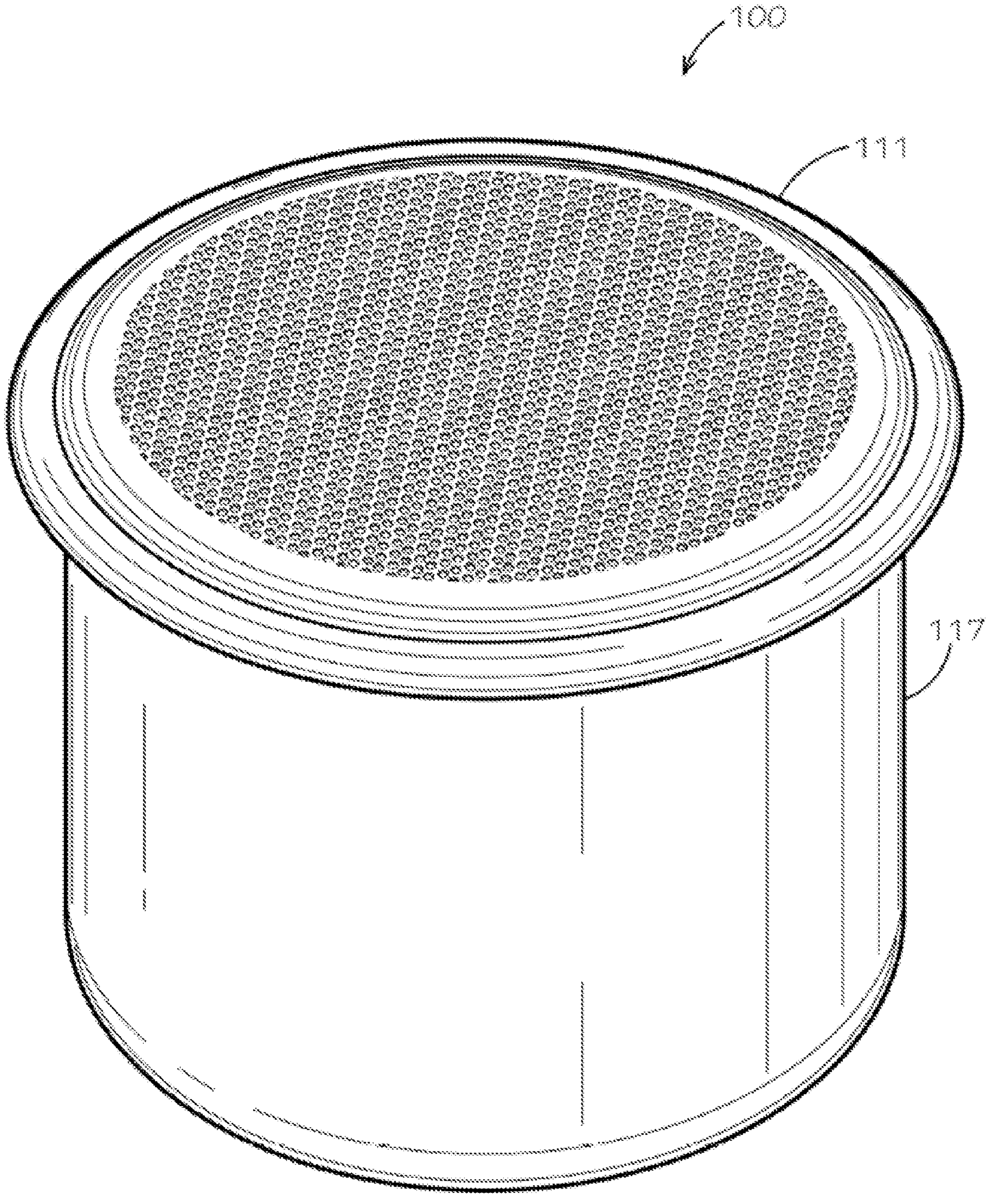
FIG. 2A illustrates a perspective view of the speaker housing assembly from FIG. 1, according to one embodiment described herein.
Figure 2B:
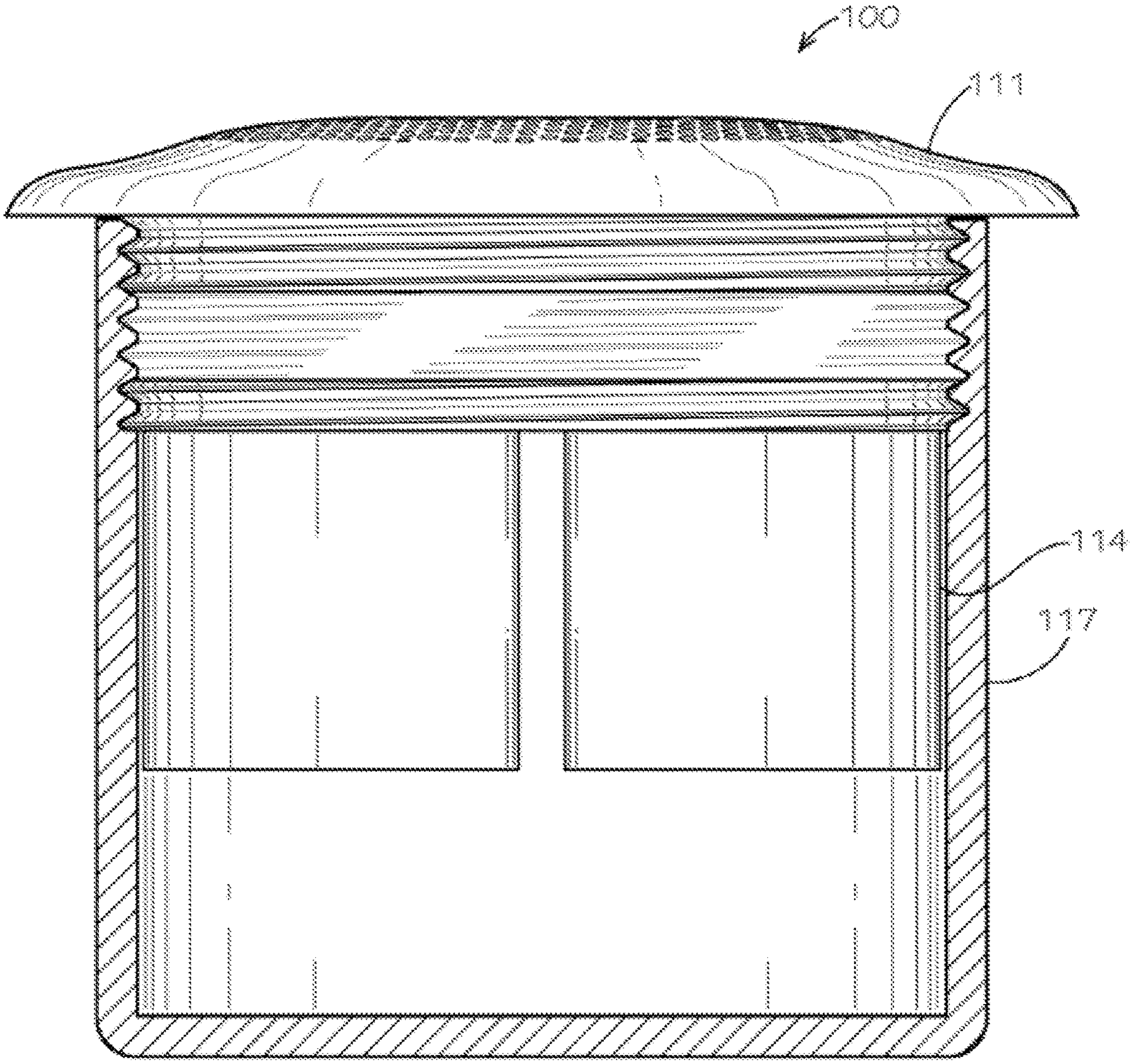
FIG. 2B illustrates a cross-sectional view of the speaker housing assembly from FIG. 2A, according to one embodiment described herein.

With reference to FIGS. 2A and 2B, shown are different views of the speaker housing assembly 100. FIG. 2A illustrates a perspective view of the speaker housing assembly 100 from FIG. 1. FIG. 2B illustrates a cross-sectional view of the speaker housing assembly 100. The speaker housing assembly 100 can include a speaker cover 111, a mounting bracket 114, a base enclosure 117, and other suitable components.

As shown in FIG. 2B, the mounting bracket 114 can be attached to an interior of the base enclosure 117. In some embodiments, the interior surface of the base enclosure 117 can have a first set of threads that form a threaded engagement with threads on the outer surface of the mounting bracket 114. In other embodiments, the mounting bracket 114 can be attached using a friction fit, an adhesive substance, one or more fasteners and other suitable methods. Additionally, the speaker cover 111 can be attached to a distal end of the base enclosure 117. The speaker cover 111 can have threads that form another threaded engagement with a second set of threads on the interior surface of the base enclosure 117.

As shown in FIG. 2B, shown is a cross-sectional view of the speaker housing assembly 100. In FIG. 2B, the speaker housing assembly 100 includes the speaker cover 111, the mounting bracket 114, and the base enclosure 117. The mounting bracket 114 and the speaker cover 111 have a first threaded engagement and a second threaded engagement with the inner threads 210 (FIG. 4) of the base enclosure 117. The first threaded engagement with the speaker cover 111 is above and separate from the second threaded engagement with the mounting bracket 114.

The speaker housing assembly 100 can be assembled in various manners. In one non-limiting example, the speaker housing assembly 100 can be assembled by first screwing the mounting bracket 114 into the interior of the base enclosure 117. A speaker can then be installed inside of the speaker housing assembly. A portion of the speaker can be inserted through a portion of the mounting bracket 114. Wiring for the speaker can be threaded through a hole in a side of the base enclosure 117. Then, the speaker cover 111 can be screwed onto top of the base enclosure 117. The various components of the embodiments be attached or assembled in other manners. For example, the components may be attached by friction connections, adhesive, fasteners, and other suitable methods.

Figure 3A:
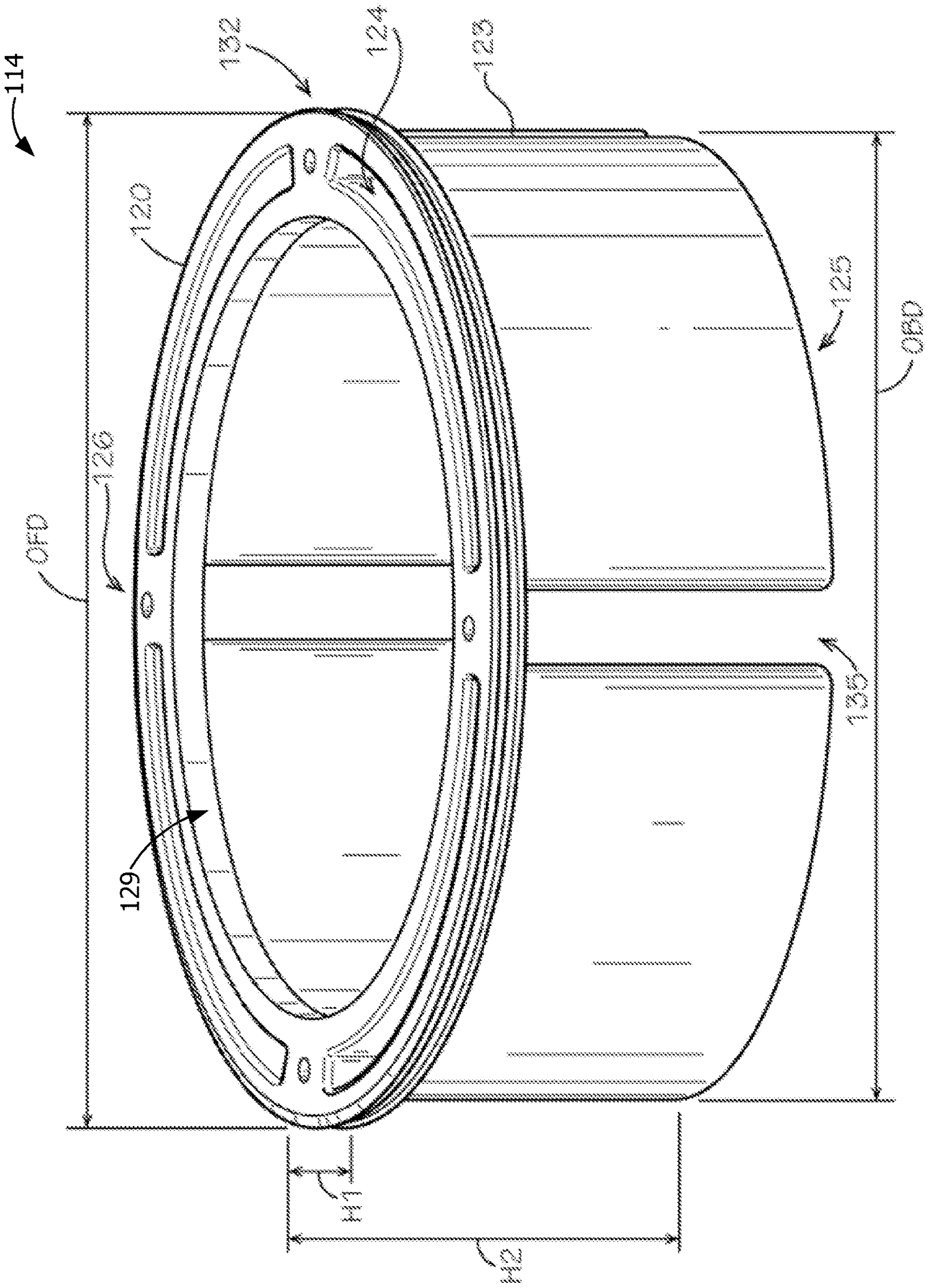
FIG. 3A illustrates a perspective view of the mounting bracket from FIG. 2B, according to one embodiment described herein.

With reference to FIG. 3A, shown is a perspective view of the mounting bracket 114. The mounting bracket 114 can be used to fasten a speaker to the interior of the speaker housing assembly 100. As shown, the mounting bracket 114 can include a flange 120, baffles 123, mounting apertures 126, a speaker aperture 129, and other suitable components. The flange 120 can be used to attach a speaker to the interior of the base enclosure 117 (FIGS. 2A and 2B). The flange 120 can surround the mounting aperture 126. The flange 120 can have outer threads 132 along the edge of the perimeter. The flange 120 can also have baffles 123 and mounting apertures 126 along its perimeter. In the illustrated embodiments, each baffle 123 can be located between two mounting apertures 126. The flange 120 can have a first height along the longitudinal axis of the mounting bracket 114. The first height H1 can form a portion of the total height of the mounting bracket 114.

Additionally, the flange 120 comprises outer threads 132 on the side of the flange 120. The outer threads 132 can be used to form a threaded engagement with an interior of the base enclosure 117. The flange 120 has an outer flange diameter 'FD' that extends from two points on the outer threads 132 that are diametrically opposite.

The baffles 123 can be used to allow for the passage of airflow while the speaker is providing sound. The passage of air through the baffle 123 improves the sound quality of the audio. In the illustrated embodiment, each baffle 123 forms an elongated slot, in which the slot has an arcuate shape along the perimeter of the flange 120. Additionally, the arcuate shape of the baffle 123 extends from a top baffle opening 124 to a bottom baffle opening 125. The baffles 123 can have a second height "H2" along the longitudinal axis of the mounting bracket 114. In the illustrated embodiment, the second height H2 is longer than the first height H1 of the flange 120. As can be appreciated, the baffles 123 can be constructed in other shapes and with different dimensions. Particularly, it is also noted that the baffles 123 can be constructed with different shapes and dimensions to change the sounds of the audio. Additionally, the outer baffle diameter 'OBD' from a first baffle to a second baffle is less than the outer flange diameter 'OFD.'' As such, in the illustrated embodiment, the outer surface of the baffle 123 is recessed with respect to the outer surface of the flange 120 or the outer threads 132 of the flange 120. Although four baffles 123 are shown, the number of baffles 123 can vary. Additionally, between every two baffles 123 is a baffle gap 135 as shown in FIG. 3A.

The mounting apertures 126 can be used to attach a perimeter of the speaker to the flange 120 with fasteners. Although four mounting apertures 126 are shown in FIG. 3A, the number of the mounting apertures 126 can vary along the flange 120. Additionally, the speaker cone can be inserted through the speaker aperture 129.

Figure 3B:
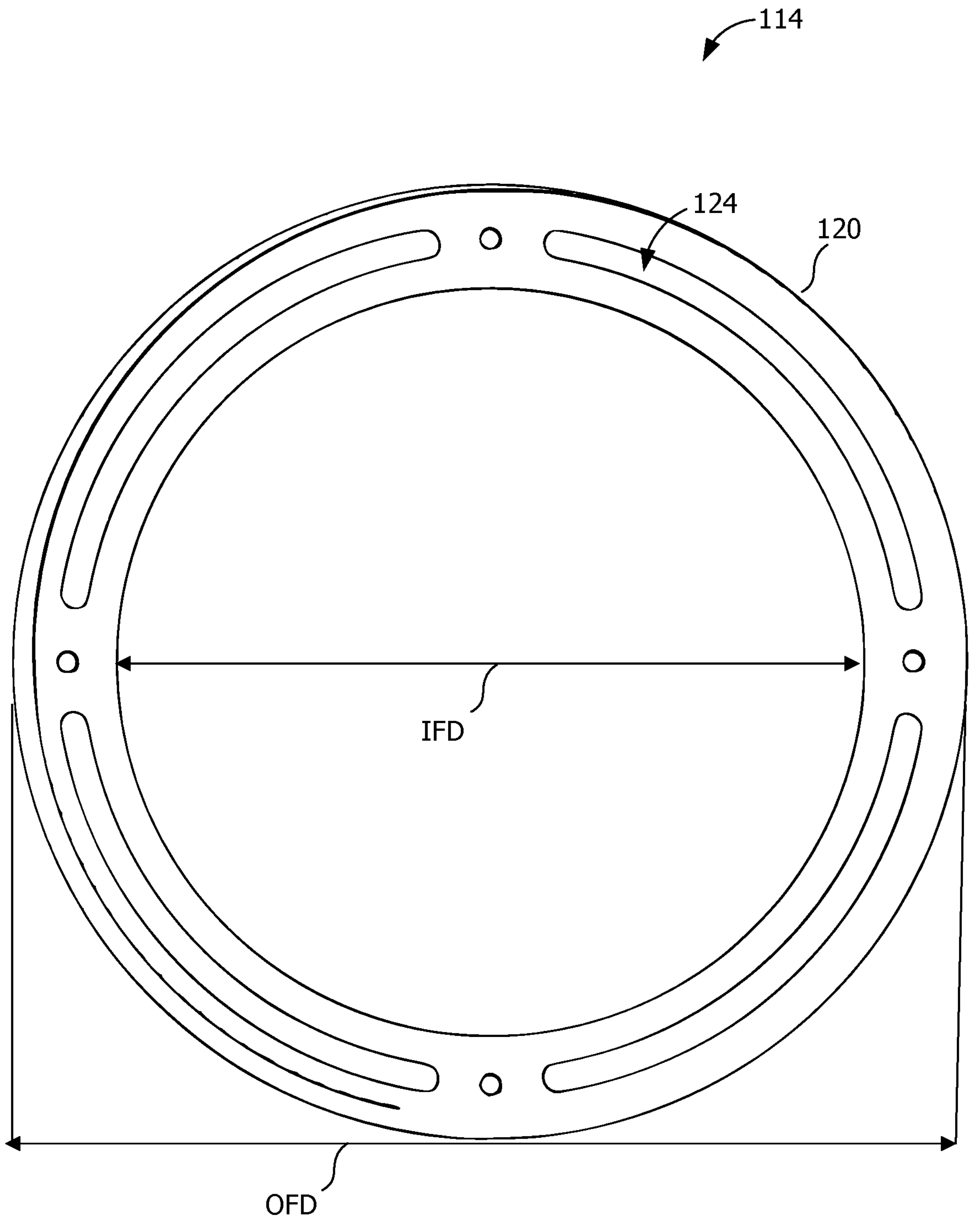
FIG. 3B illustrates a top view of the mounting bracket from FIG. 3A, according to one embodiment described herein.
Figure 3C:
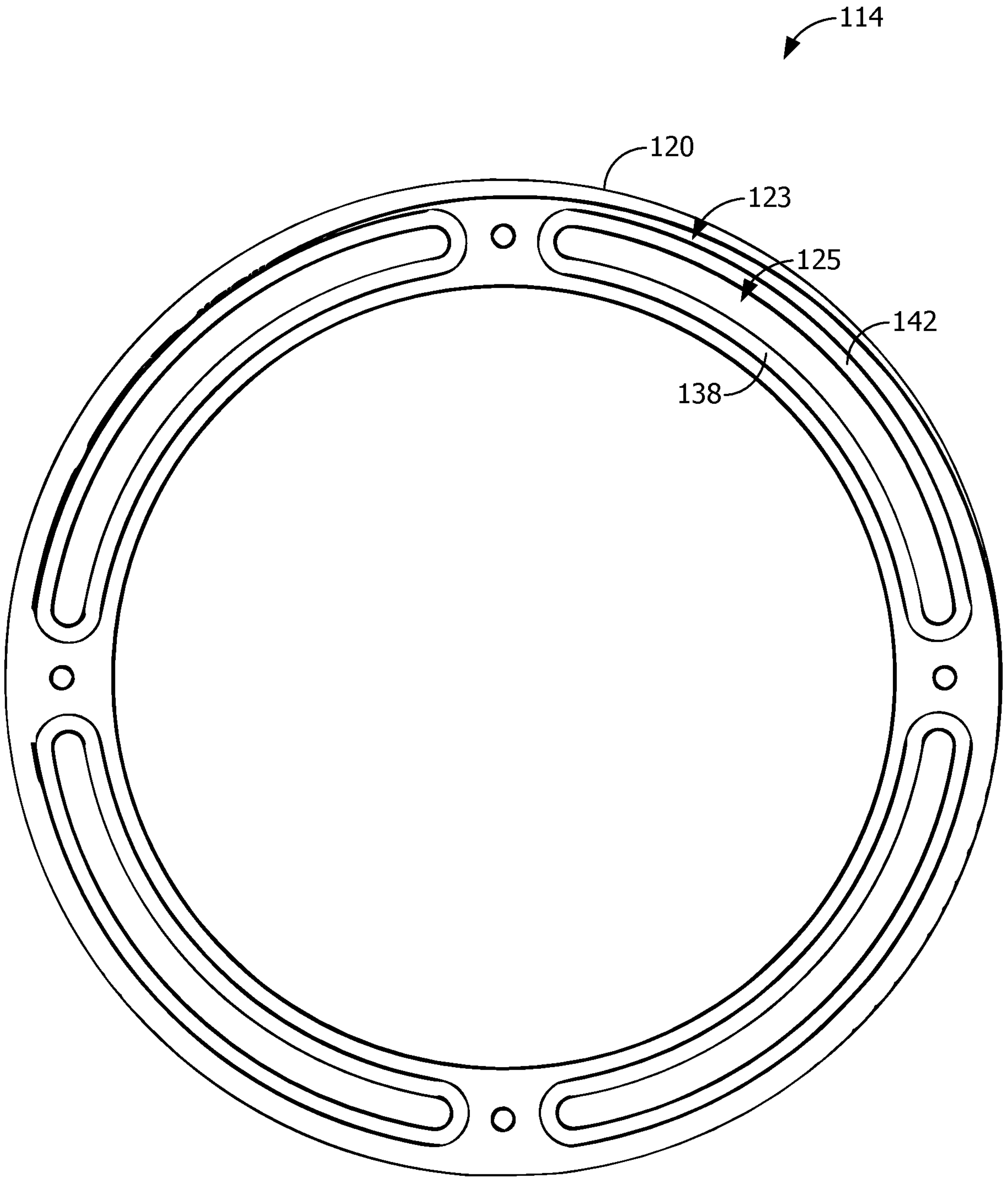
FIG. 3C illustrates a bottom view of the mounting bracket from FIG. 3A according to one embodiment described herein.

Next, with reference to FIGS. 3B and 3C, shown are different views of the mounting bracket 114. FIG. 3B is a top view of the mounting bracket 114 and FIG. 3C is a bottom view of the mounting bracket 114. FIG. 3B illustrates that the flange 120 has an inner flange diameter 'IFD' that is smaller than the outer flange diameter 'OFD.'

As shown in FIG. 3C, the baffles 123 has an inner baffle wall 138 and an outer baffle wall 142. The inner baffle wall 138 and the outer baffle wall define the bottom baffle opening 125. As illustrated, there are two pairs of baffles 123 that are diametrically opposite of each other. For a pair of baffles 123 that are diametrically opposite, a diameter distance between a first inner baffle wall 138 of a first baffle 123 and a second inner baffle wall 138 of a second baffle 123 is greater than the inner flange diameter 'IFD' and is less than the outer flange diameter 'OFD.' Likewise, a diameter distance between a first outer baffle wall 142 of the first baffle 123 and a second outer baffle wall 142 of the second baffle 123 is greater than the inner flange diameter 'IFD' and is less than the outer flange diameter 'OFD.' As such, in the illustrated example, the baffles 123 are positioned that they are recessed away from an inner edge of the flange 120 and they are recessed away from an outer edge of the flange 120. In other embodiments, the inner baffle wall 138 or the outer baffle wall 142 of baffles 123 may be aligned with the inner edge of the flange 120 or the outer edge of the flange 120.

Figure 4:
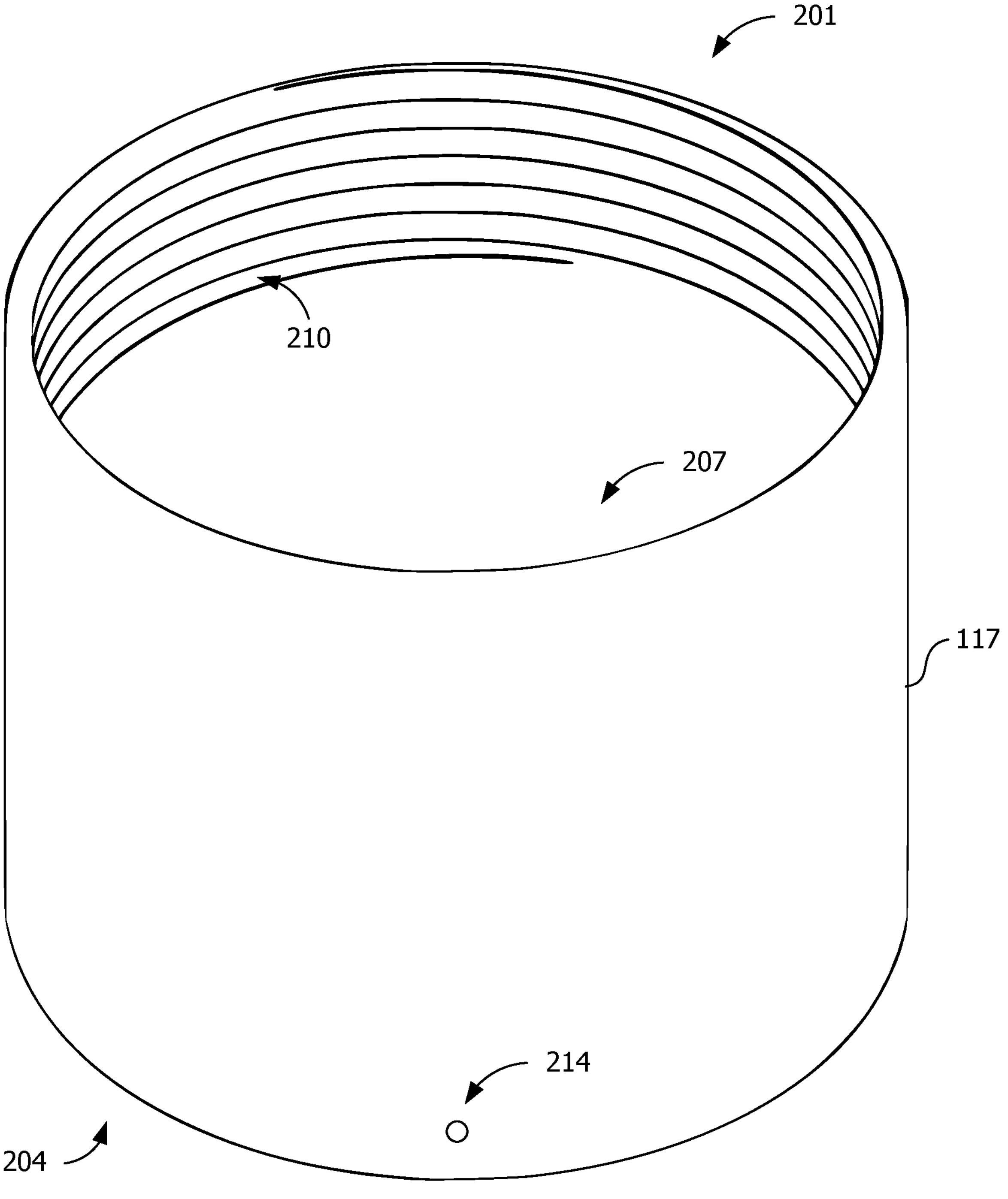
FIG. 4 illustrates a perspective view of the base enclosure from FIG. 2A, according to one embodiment described herein.

With reference to FIG. 4, shown is the base enclosure 117 from the speaker housing assembly 100 (FIGS. 2A and 2B). The base enclosure 117 has a first end 201 and a second end 204. The first end 201 of the base enclosure 117 has an opening 207 that allows access to the interior of the base enclosure 117. Additionally, the first end 201 of the base enclosure 117 includes a set of inner threads 210. The inner threads 210 can be located on an interior wall of the base enclosure 117. The inner threads 210 can be located at the region near the first end of the opening 207 of the base enclosure 117. As shown previously, a lower region of the inner threads 210 can be used to form a threaded engagement with the outer threads 132 of the flange 120. The lower region of the inner threads 210 can be the portion of the inner threads 210 that is closer to the second end 204 of the base enclosure An upper region of the inner threads 210 can form a threaded engagement with the speaker cover 111. The upper region of the inner threads 210 can be closer to the first end 201 of the base enclosure 117 than the second end 204 of the base enclosure 117.

Additionally, the base enclosure 117 includes a wire aperture 214 near the second end 204 of the base enclosure 117. The wire aperture 214 can be an opening that provides access to the interior of the base enclosure 117. The speaker wire tied to the speaker mounted to the mounting bracket 114 can be inserted through the wire aperture 214 and attached to an entertainment system. In some examples, the wire aperture 214 may include a knock-out that can be detached from the base enclosure 117 by applying a force to the knock-out. Although one circular wire aperture 214 is shown, the number of and shape of the wire apertures 214 can vary. Likewise, the location of the wire aperture 214 can vary on the side of the base enclosure 117.

Figure 5A:
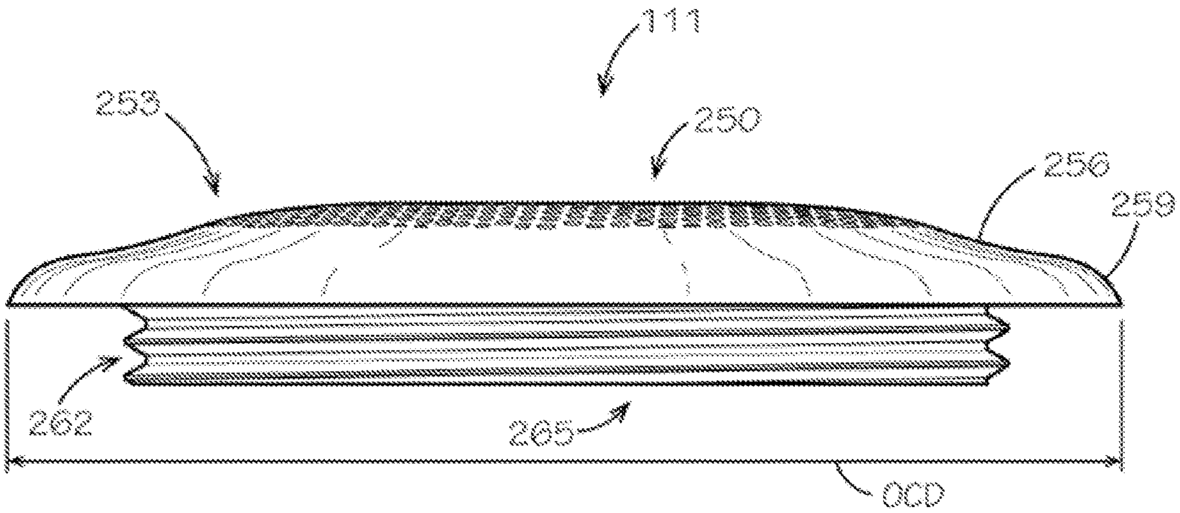
FIG. 5A illustrates a side view of the speaker cover from FIG. 2A, according to one embodiment described herein.
Figure 5B:
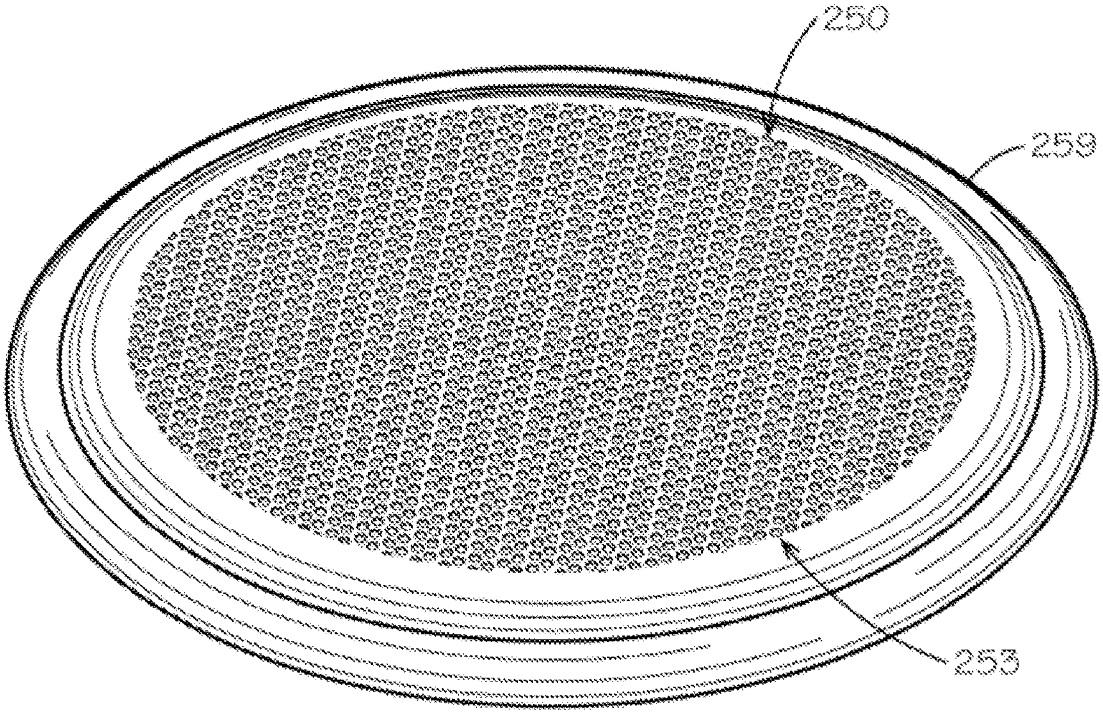
FIG. 5B illustrates a top view of the speaker cover from FIG. 5A, according to one embodiment described herein.

With reference to FIG. 5A and FIG. 5B, shown are different views of the speaker cover 111. FIG. 5A is a drawing of side view of the speaker cover 111 and FIG. 5B is a drawing of a perspective view of the speaker cover 111. As shown in FIG. and 5B, the speaker cover 111 has speaker holes 250 that allow for air movement caused by the speaker to travel from the interior of the speaker housing assembly 100 to the exterior of the speaker housing assembly 100. The speaker holes 250 can be located substantially near a center of the speaker cover 111. As shown in FIG. 5B, the speaker holes 250 are located within a speaker hole perimeter 253.

Beyond the speaker hole perimeter 253, the speaker cover 111 can include a recessed surface 256. Thus, the recessed surface 256 has a greater diameter than the speaker hole perimeter 253. The recessed surface 256 can be positioned on the perimeter of the hole in the floor panel 108 of the deck drainage system 103.

Further, the speaker cover 111 has a lip 259 near the edge of the speaker cover 111. Below the lip 259 and recessed within, the speaker cover 111 includes a threaded extension 262. The threaded extensions 262 can be used to form a threaded engagement with the upper region of the inner threads 210 of the base enclosure 117. The interior 265 of the speaker cover 111 can be hollow and allows for air to travel to and from the interior of the base enclosure 117. The speaker cover 111 has an outer cover diameter 'OCD' that is greater than the diameter of the threaded extensions 262. Additionally, the outer cover diameter 'OCD' is greater than the outer diameter of the base enclosure 117.

Next, a description of an exemplary method for assembling the speaker housing assembly 100 is provided. For example, a base enclosure of the speaking house assembly can be provided first. Then, the mounting bracket 114 can be attached to the interior of the base enclosure. In some examples, the outer thread 132 of the flange 120 can be oriented to engage with the inner threads 210 of the base enclosure 117. The mounting bracket 114 can be screwed into the base enclosure 117 until it reaches the lower region of the inner threads 210 or until the mounting bracket 114 is spaced away from the first end 201 of the base enclosure to provide enough spacing for the speaker cover 111. Other methods of attachment may be used, such as adhesive, fasteners, a friction fit connection, and other suitable methods.

Next, the threaded extension 262 of the speaker cover 111 can be oriented with the inner threads 210 of the base enclosure 117 to form a second threaded engagement with the base enclosure 117. The speaker cover 111 can be screwed until the first end 201 of the base enclosure 117 is near or contacts the speaker cover 111.

In some examples, a waterproof sealant can be applied between the first end 201 of the base enclosure 117 and the speaker cover 111. For example, a caulk material can be applied between the speaker cover 111 and the first end 201 of the base enclosure. In other examples, a thread sealant tape may be applied to the inner threads 210 of the base enclosure and/or to the threaded extension 262 of the speaker cover 111.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method of assembling a speaker housing assembly for a deck drainage system, comprising:

- providing a base enclosure of the speaker housing assembly;
- attaching a mounting bracket in an interior of the base enclosure;
- positioning a speaker within a speaker aperture of the mounting bracket;
- attaching, using a fastener, a perimeter of the speaker to the mounting bracket;
- attaching a speaker cover to an end of the base enclosure; and
- inserting the speaker housing assembly into an opening of the deck drainage system.

2. The method of claim 1, wherein attaching the mounting bracket to the interior of the base enclosure comprises forming a first threaded engagement between a perimeter of the mounting bracket and an interior surface of the base enclosure.

3. The method of claim 2, wherein attaching the speaker cover to the end of the base enclosure comprises forming a second threaded engagement between a threaded extension of the speaker cover and the interior surface of the base enclosure.

4. The method of claim 3, wherein the base enclosure comprises a threaded surface on the interior surface of the base enclosure, the mounting bracketing forming the first threaded engagement with a first region of the threaded surface and threaded extension of the speaker cover forming the second threaded engagement with a second region of the threaded surface.

5. The method of claim 1, wherein the mounting bracket has a flange that is configured to be attached to a speaker.

6. The method of claim 5, wherein the flange has a baffle along a flange perimeter of the flange.

7. The method of claim 6, wherein the baffle comprises:

a baffle wall, the baffle wall extending from a top baffle opening to a bottom baffle opening along a longitudinal axis of the mounting bracket; or an arcuate shape along the flange perimeter of the flange.

8. The method of claim 1, wherein the mounting bracket has a flange and the flange comprises a mounting aperture along the perimeter.

9. The method of claim 1, wherein the speaker cover has a greater outer diameter than an outer diameter of the base enclosure.

10. The method of claim 1, wherein the end is a first end of the base enclosure, the flange of the mounting bracket being closer to the first end of the base enclosure than a second end of the base enclosure.

11. The method of claim 1, wherein the opening is in a floor panel of the deck drainage system.

12. The method of claim 1, wherein the speaker cover comprises a recessed surface.

13. The method of claim 12, wherein inserting the speaker housing assembly comprises positioning the recessed surface of the speaker cover on an opening perimeter of the opening of the deck drainage.

14. A method of assembling a speaker housing assembly for a deck drainage system, comprising:

providing a base enclosure of the speaker housing assembly;

attaching a mounting bracket in an interior of the base enclosure, wherein attaching the mounting bracket to the interior of the base enclosure comprises forming a first threaded engagement between a perimeter of the mounting bracket and an interior surface of the base enclosure;

positioning a speaker within a speaker aperture of the mounting bracket;

attaching, using a fastener, a perimeter of the speaker to the mounting bracket; and attaching a speaker cover to an end of the base enclosure.

15. The method of claim 14, wherein attaching the speaker cover to the end of the base enclosure comprises forming a second threaded engagement between a threaded extension of the speaker cover and the interior surface of the base enclosure.

16. The method of claim 15, wherein the base enclosure comprises a threaded surface on the interior surface of the base enclosure, the mounting bracketing forming the first threaded engagement with a first region of the threaded surface and threaded extension of the speaker cover forming the second threaded engagement with a second region of the threaded surface.

17. The method of claim 14, further comprising inserting the speaker housing assembly into an opening of the deck drainage system.

18. A method of assembling a speaker housing assembly for a deck drainage system, comprising:

providing a base enclosure of the speaker housing assembly;

attaching a mounting bracket in an interior of the base enclosure, wherein the mounting bracket has a flange that is configured to be attached to a speaker, and the flange has a baffle along a flange perimeter of the flange;

positioning a speaker within a speaker aperture of the mounting bracket;

attaching, using a fastener, a perimeter of the speaker to the mounting bracket; and attaching a speaker cover to an end of the base enclosure.

19. The method of claim 18, wherein the baffle comprises:

a baffle wall, the baffle wall extending from a top baffle opening to a bottom baffle opening along a longitudinal axis of the mounting bracket; or the baffle comprises an arcuate shape along the flange perimeter of the flange.

20. The method of claim 18, further comprising inserting the speaker housing assembly into an opening of the deck drainage system.

* * * * *